US010741918B2

United States Patent
Yamagishi et al.

(10) Patent No.: US 10,741,918 B2
(45) Date of Patent: Aug. 11, 2020

(54) NFC ANTENNA AND DISPLAY DEVICE

(71) Applicant: SHARP KABUSHIKI KAISHA, Sakai, Osaka (JP)

(72) Inventors: Shinji Yamagishi, Sakai (JP); Yasuhiro Sugita, Sakai (JP); Jean Mugiraneza, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 37 days.

(21) Appl. No.: 16/316,521

(22) PCT Filed: Aug. 30, 2017

(86) PCT No.: PCT/JP2017/031060
§ 371 (c)(1),
(2) Date: Jan. 9, 2019

(87) PCT Pub. No.: WO2018/043526
PCT Pub. Date: Mar. 8, 2018

(65) Prior Publication Data
US 2019/0237875 A1    Aug. 1, 2019

(30) Foreign Application Priority Data
Aug. 31, 2016   (JP) .................................. 2016-169891

(51) Int. Cl.
| | |
|---|---|
| *H01Q 7/00* | (2006.01) |
| *H01Q 1/44* | (2006.01) |
| *G06K 19/077* | (2006.01) |
| *H01Q 1/22* | (2006.01) |

(52) U.S. Cl.
CPC ......... *H01Q 7/00* (2013.01); *G06K 19/07749* (2013.01); *G06K 19/07773* (2013.01); *H01Q 1/2225* (2013.01); *H01Q 1/44* (2013.01)

(58) Field of Classification Search
None
See application file for complete search history.

(56) References Cited

U.S. PATENT DOCUMENTS

| | | | | |
|---|---|---|---|---|
| 7,712,672 | B2 * | 5/2010 | Takahashi | G06K 7/10336 235/492 |
| 2011/0193753 | A1 * | 8/2011 | Kim | H01Q 1/1271 343/702 |
| 2011/0273382 | A1 * | 11/2011 | Yoo | G06F 3/041 345/173 |
| 2013/0002510 | A1 * | 1/2013 | Azulay | H01Q 1/243 343/860 |
| 2013/0249663 | A1 * | 9/2013 | Cho | H01F 38/14 336/200 |
| 2013/0264390 | A1 * | 10/2013 | Frey | H01Q 1/2225 235/492 |
| 2018/0287243 | A1 * | 10/2018 | Ko | H01Q 1/241 |

FOREIGN PATENT DOCUMENTS

JP      2013-005013 A     1/2013

* cited by examiner

*Primary Examiner* — Crystal L Hammond
(74) *Attorney, Agent, or Firm* — ScienBiziP, P.C.

(57) ABSTRACT

An embodiment of the present invention has a decreased antenna resistance so as to conform to the EMV specification. An NFC antenna includes: a mesh antenna pattern line (10) being transparent and formed in a netlike form in a display region (R1); and a non-mesh antenna pattern line (13) being formed in a form having no mesh in a non-display region (R2).

11 Claims, 11 Drawing Sheets

NFC ANTENNA AND DISPLAY DEVICE

TECHNICAL FIELD

The present invention relates to a loop Near Field Communication (NFC) antenna which is provided so as to be opposed to a display surface of a display panel, and a display device.

BACKGROUND ART

Conventionally, there have been proposals for various techniques of transparent antennas each of which is to be provided on a display surface of a display panel. For example, Patent Literature 1 discloses a technique in which a metal mesh is used for forming an antenna pattern on a display surface of a display panel. For the antenna disclosed in Patent Literature 1, either a random mesh or a square lattice mesh is used. Further, in the antenna disclosed in Patent Literature 1, transparent wirings are used for wirings of the antenna.

CITATION LIST

Patent Literature

[Patent Literature 1] Japanese Patent Application Publication, Tokukai, No. 2013-5013 (Publication Date: Jan. 7, 2013)

SUMMARY OF INVENTION

Technical Problem

In recent years, with regard to loop NFC antennas each of which is provided so as to face a display surface of a display panel, there have been demands for causing such a loop NFC antenna to conform to the Europay, MasterCard, VISA protocol (EMV specification). The EMV specification is one of antenna standards.

The EMV specification is one of credit card specifications and is also a unified specification of IC cards. The EMV specification is an international de fact standard specifying the "IC card terminal specification" for card transactions using IC cards in the field of finance. In general, the EMV specification is based on the international standard ISO/IEC 7816 series which specifies physical and functional conditions etc. of IC cards with a typical external terminal. The EMV specification also defines specifications of IC cards and terminals which specifications are necessary for the field of finance. More specifically, the EMV specification defines physical/electronic properties and hardware interfaces of IC cards and terminals, data elements and commands for communications between IC cards and terminals, process flows between IC cards and terminals, etc.

However, such a conventional technique disclosed in Patent Literature 1 cannot conform to the EMV specification, because of a high resistance of an antenna pattern which is made of a metal mesh. This has been a problem. In a case where as an attempt to solve the problem, such a high resistance is to be decreased for making the technique disclosed in Patent Literature 1 conform to the EMV specification, it is necessary to reduce a mesh pitch or to increase the width of an antenna pattern line. Then, this decreases an aperture ratio of an NFC antenna on a display panel, and consequently leads to problems of a deteriorated transparency of the NFC antenna and of a lower display quality of the display panel.

The technique disclosed in Patent Literature 1 employs a regular and uniform pattern, so that a decrease in resistance of the antenna and a transmittance (aperture ratio) of the antenna are in a trade-off relation. Accordingly, in the technique disclosed in Patent Literature 1, the resistance cannot be reduced while the aperture ratio is kept unchanged. This leads to an essential problem that antenna performance cannot be improved.

Further, in the technique disclosed in Patent Literature 1, the wirings are formed in a transparent manner in a wiring region of the antenna. This further increases the resistance while deteriorating the antenna performance.

The present invention is attained in view of the above problems. An object of the present invention is to provide an NFC antenna and a display device, each of which has a decreased antenna resistance and thereby can conform to the EMV specification.

Solution to Problem

In order to solve the above problem, an NFC antenna in accordance with an aspect of the present invention is configured to be an NFC antenna being a loop antenna and provided so as to face a display surface of a display panel, the display surface including a display region capable of displaying an image and a non-display region surrounding, in a frame-like manner, the display region, the NFC antenna including: a mesh antenna pattern line being transparent and formed in a netlike form in the display region; and a non-mesh antenna pattern line being formed in a form having no mesh in the non-display region.

In order to solve the above problem, a display device in accordance with an aspect of the present invention is configured to be a display device including: a display panel; an NFC antenna in accordance with an aspect of the present invention; and an antenna substrate on which the NFC antenna is provided.

Advantageous Effects of Invention

An aspect of the present invention advantageously makes it possible to provide an NFC antenna and a display device, each of which has a decreased antenna resistance and thereby can conform to the EMV specification.

Figure 4:
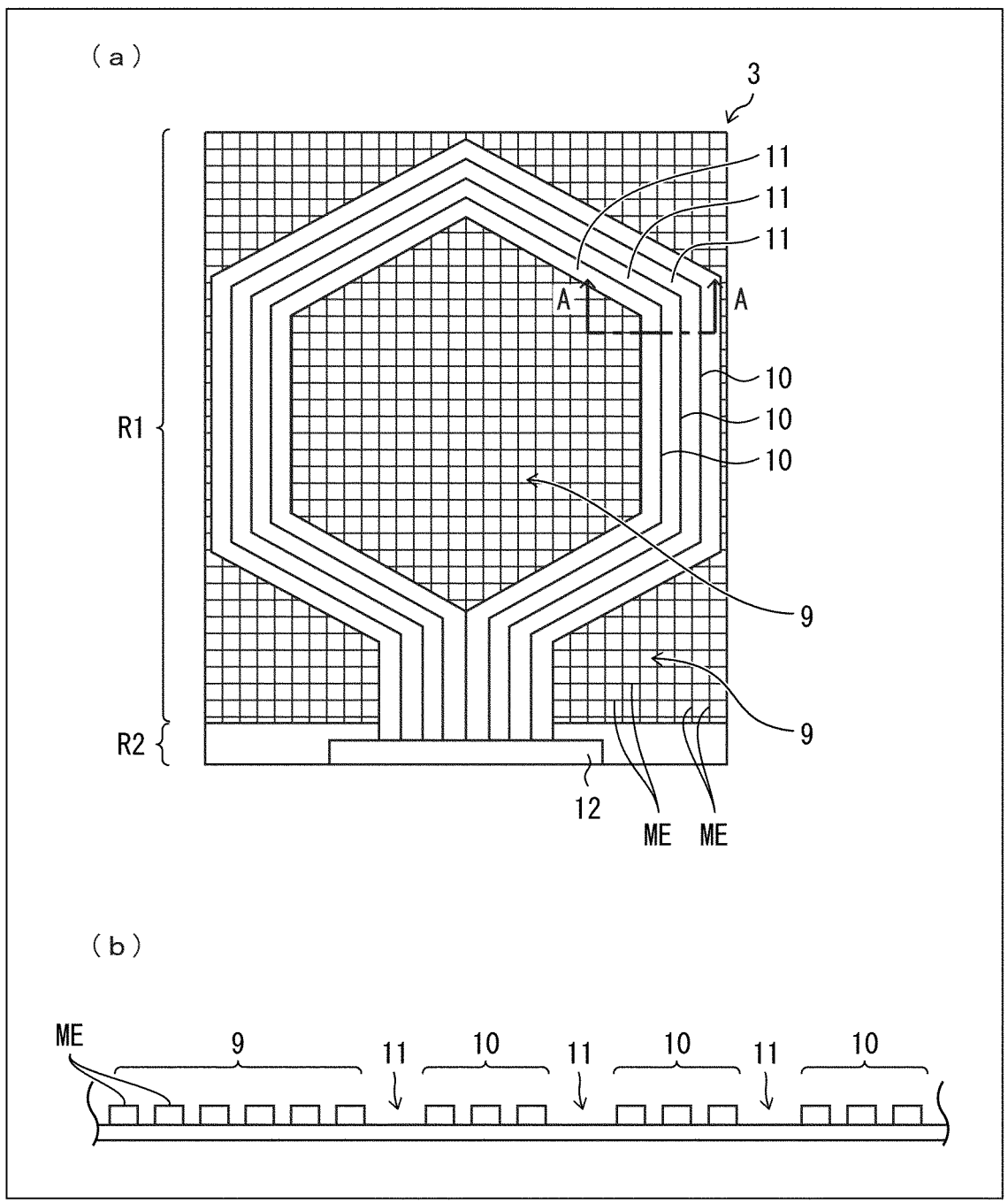

(a) of FIG. 4 is a plan view of an antenna substrate in accordance with a Comparative Example, and (b) of FIG. 4 is a cross sectional view taken along plane AA shown in (a) of FIG. 4.

Figure 5:
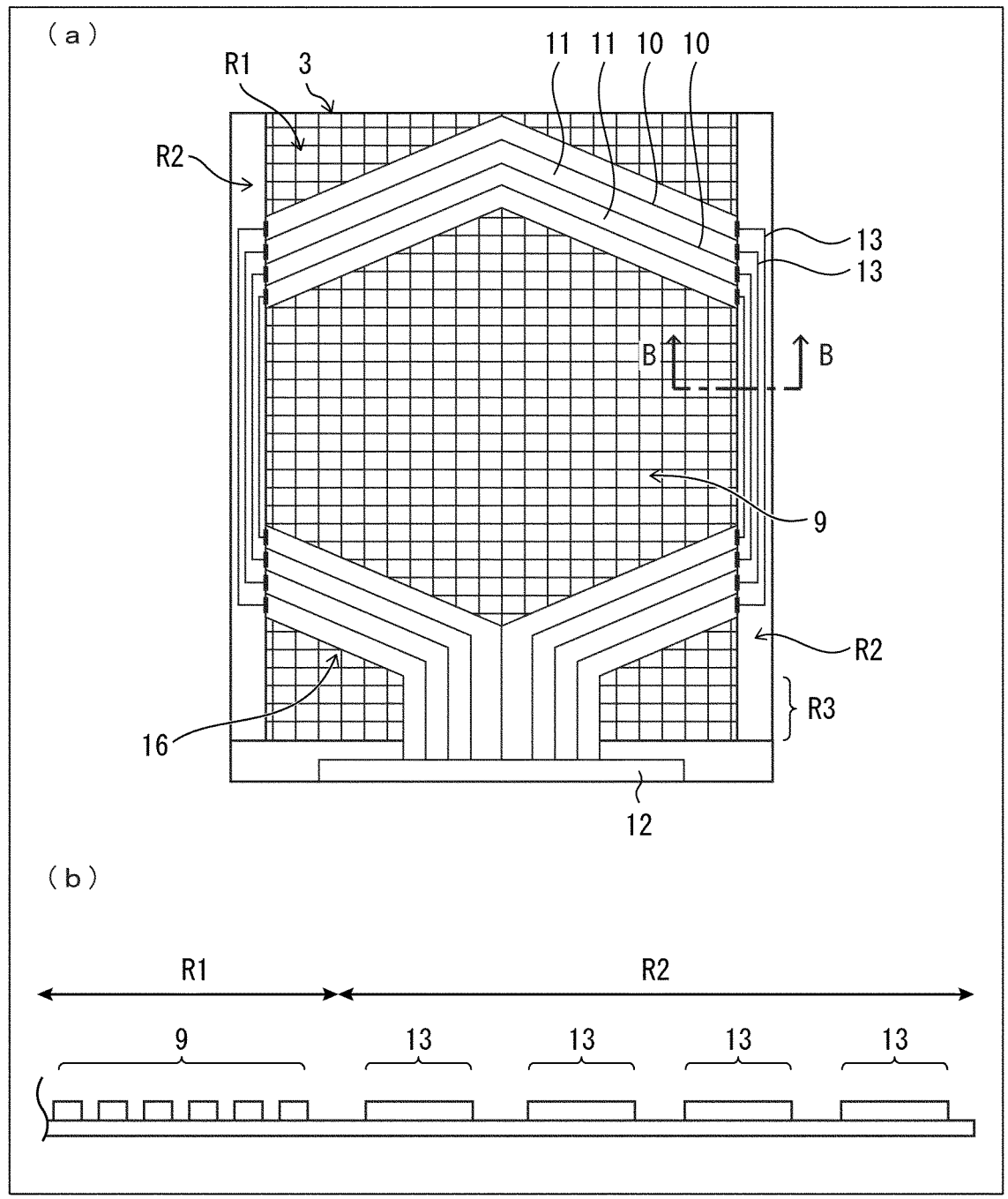

(a) of FIG. 5 is a plan view of an antenna substrate which is provided so as to be opposed to a display surface of the liquid crystal panel, and (b) of FIG. 5 is a cross sectional view taken along plane BB shown in (a) of FIG. 5.

Figure 6:
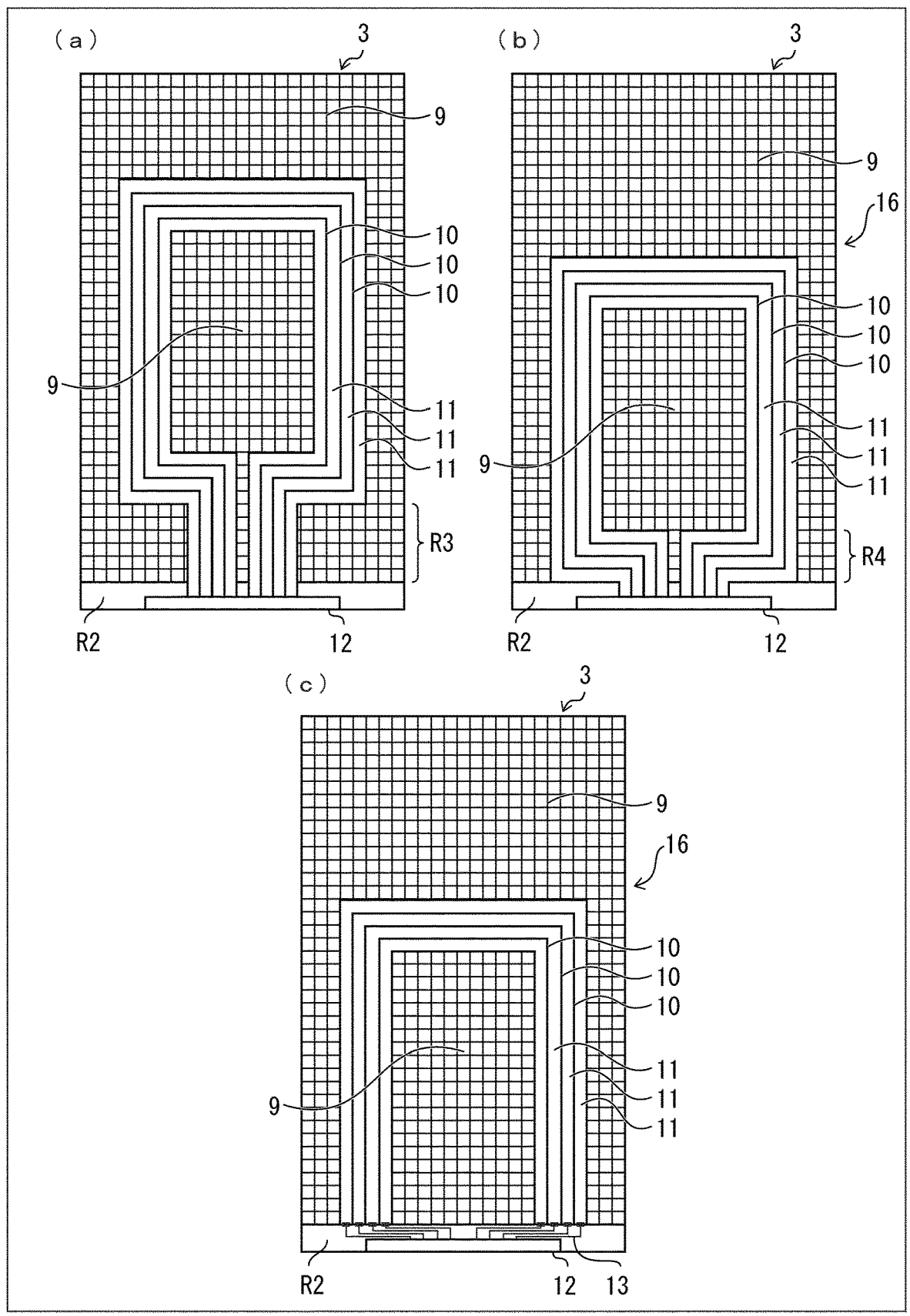

(a) of FIG. 6 is a plan view of an antenna substrate in accordance with another Comparative Example. (b) of FIG. 6 is a plan view of another antenna substrate in accordance with Embodiment 1. (c) of FIG. 6 is a plan view of still another antenna substrate in accordance with Embodiment 1.

Figure 7:
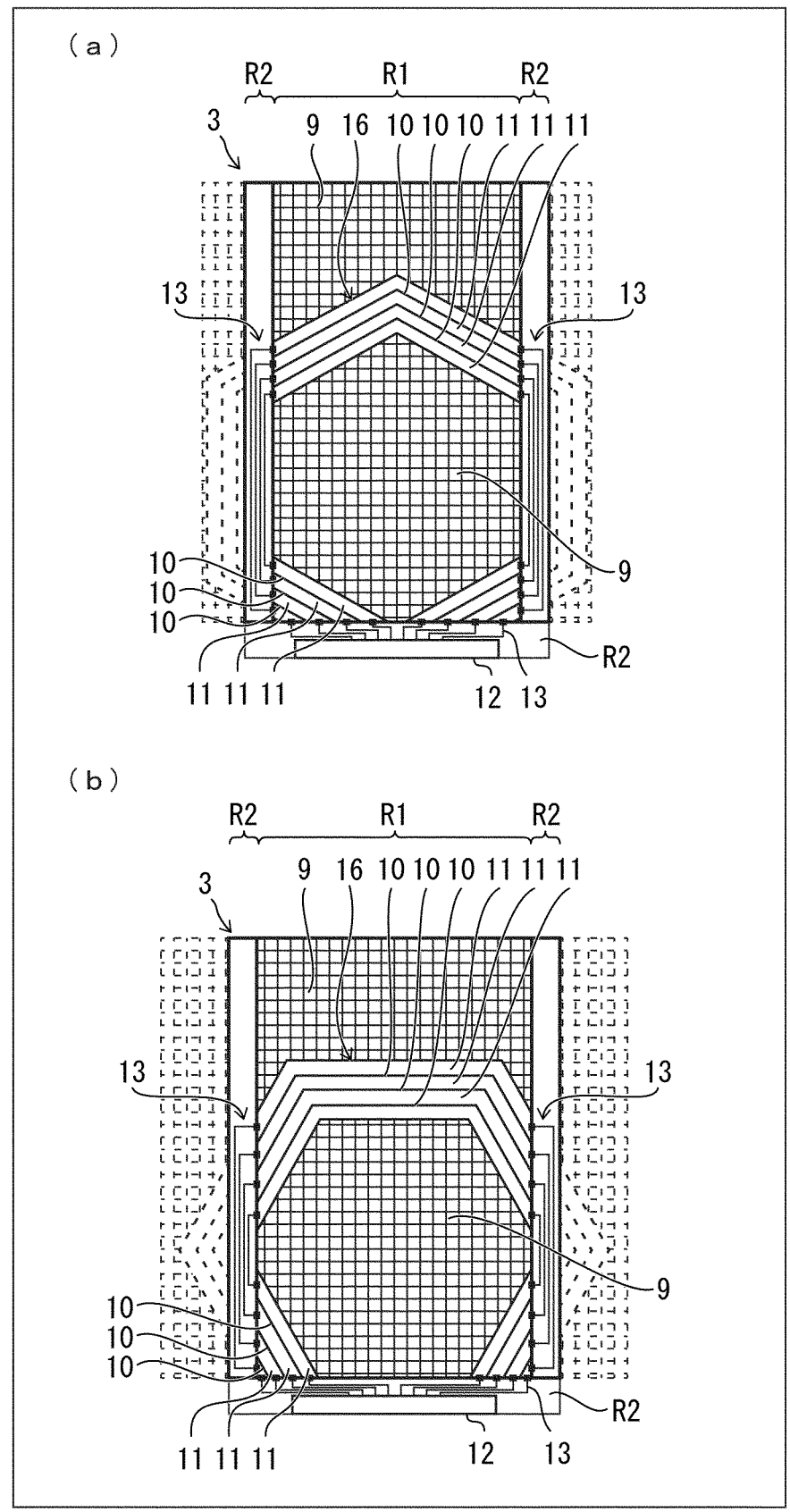

(a) of FIG. 7 is a plan view of an antenna substrate in accordance with Embodiment 2, and (b) of FIG. 7 is a plan view of another antenna substrate in accordance with Embodiment 2.

Figure 8:
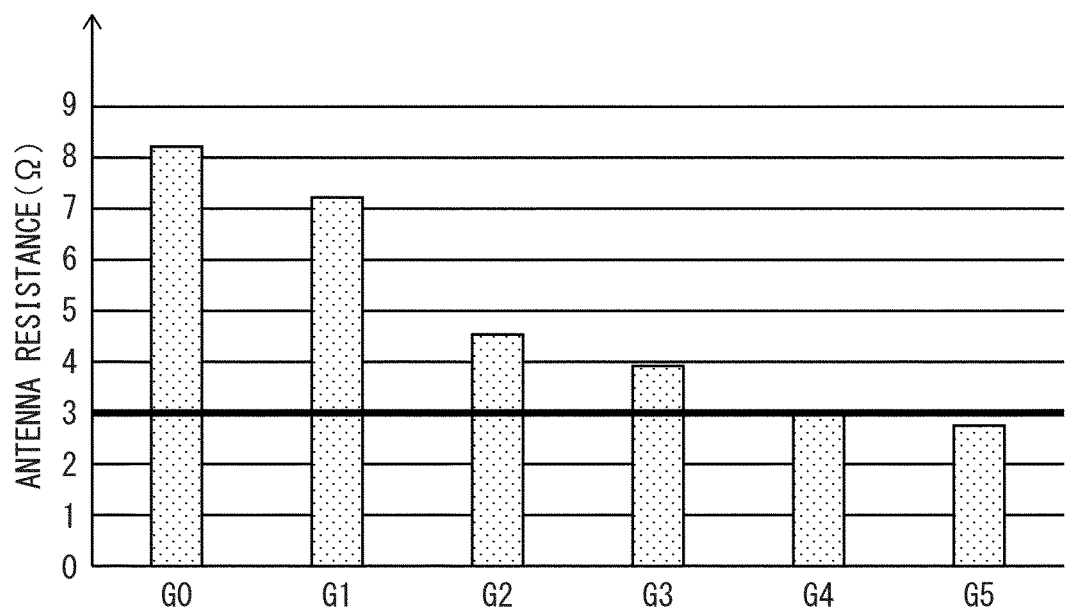

FIG. 8 is a graph showing antenna resistances of NFC antennas in accordance with Embodiments 1 and 2.

Figure 9:
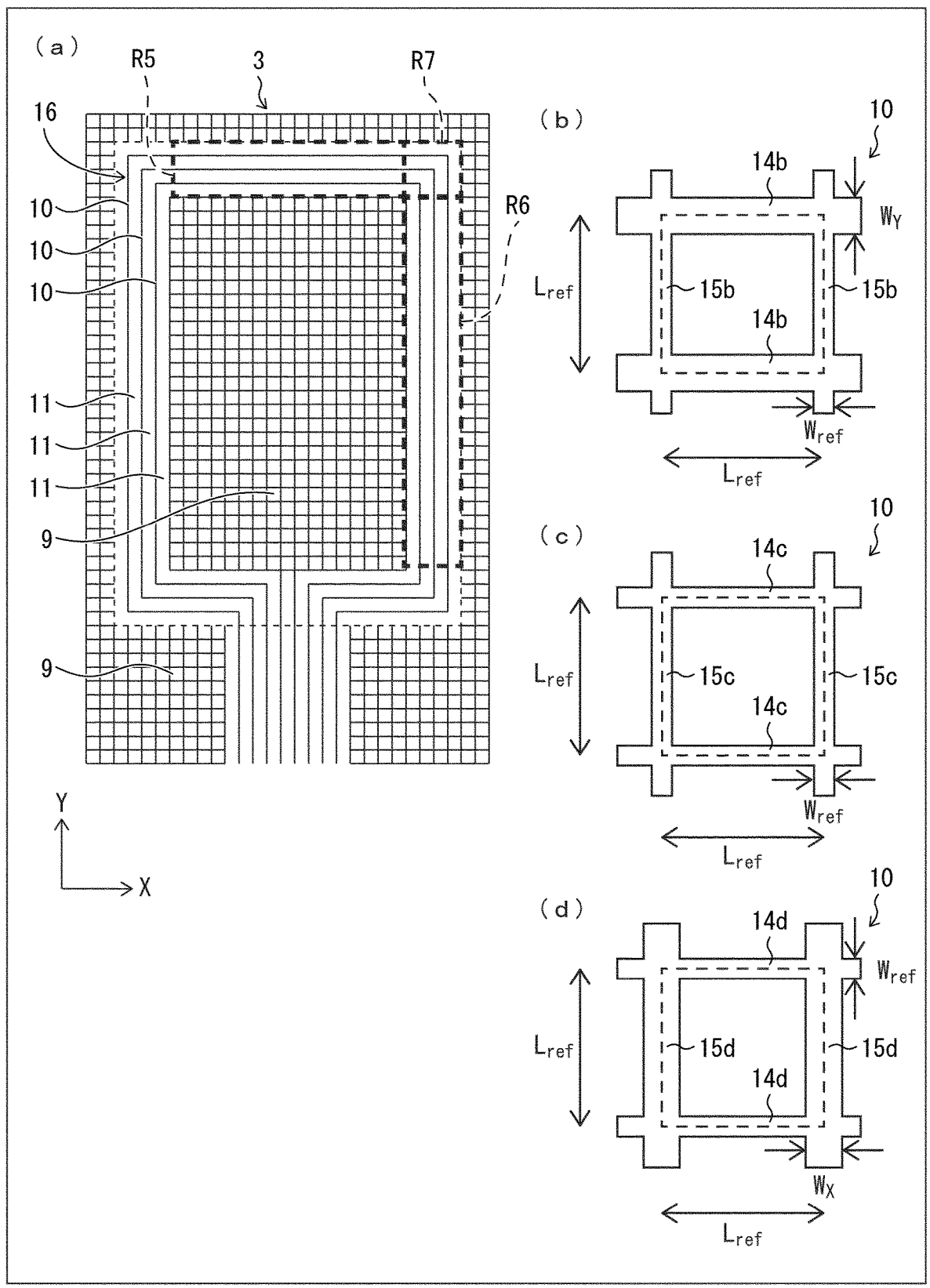

(a) of FIG. 9 is a plan view for explaining an increased width of an antenna substrate in accordance with Embodiment 3. (b) of FIG. 9 is a view illustrating a configuration of a mesh antenna pattern line in a transverse region of the antenna substrate. (c) of FIG. 9 is a view illustrating a configuration of a mesh antenna pattern line in a corner region of the antenna substrate. (d) of FIG. 9 is a view illustrating a configuration of a mesh antenna pattern line in a longitudinal region of the antenna substrate.

Figure 10:
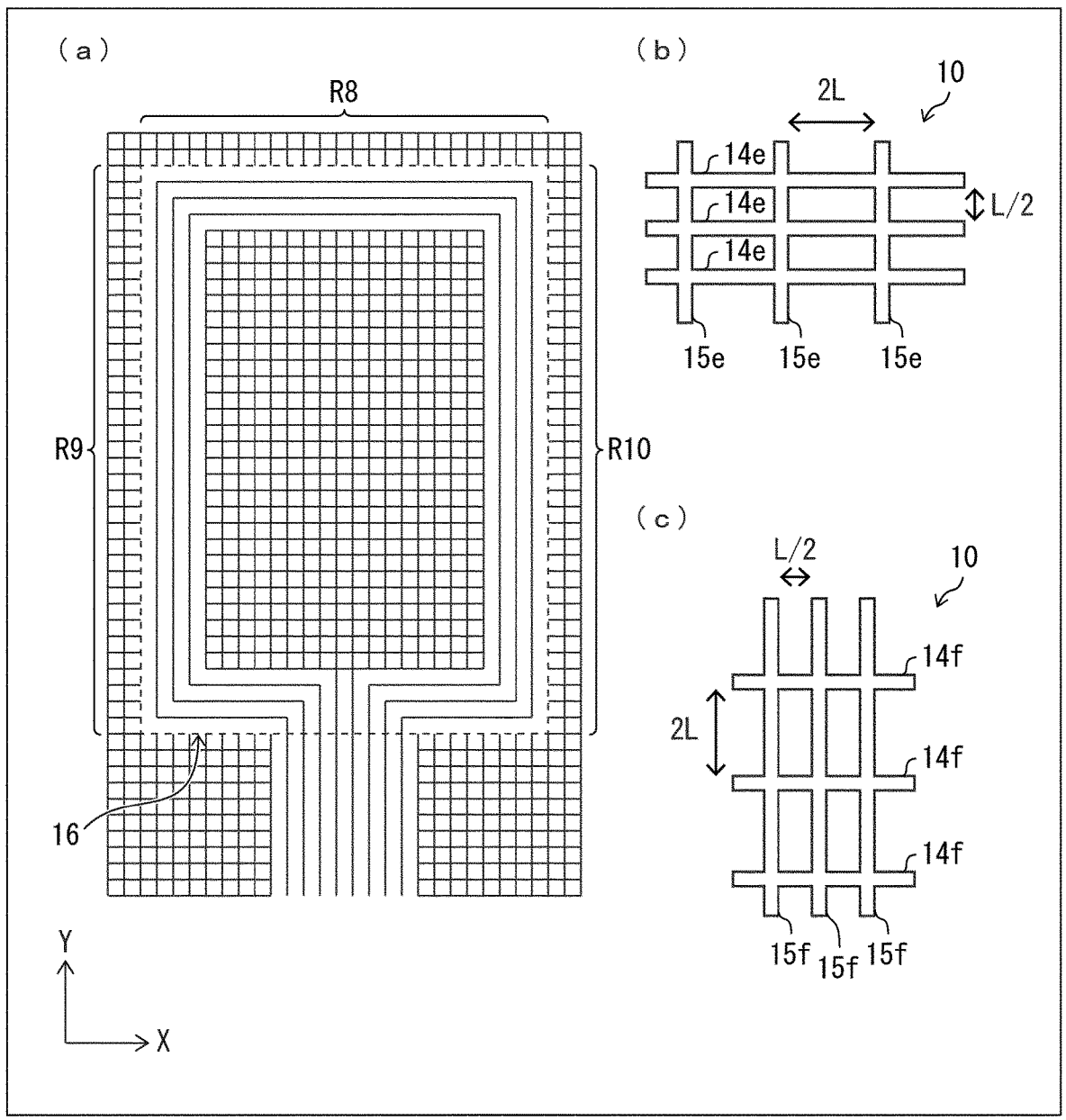

(a) of FIG. 10 is a plan view for explaining anisotropy of an antenna substrate in accordance with Embodiment 3. (b) of FIG. 10 is a view illustrating a configuration of a mesh antenna pattern line in a transverse region of the antenna substrate. (c) of FIG. 10 is a view illustrating a configuration of a mesh antenna pattern line in a longitudinal region of the antenna substrate.

Figure 11:
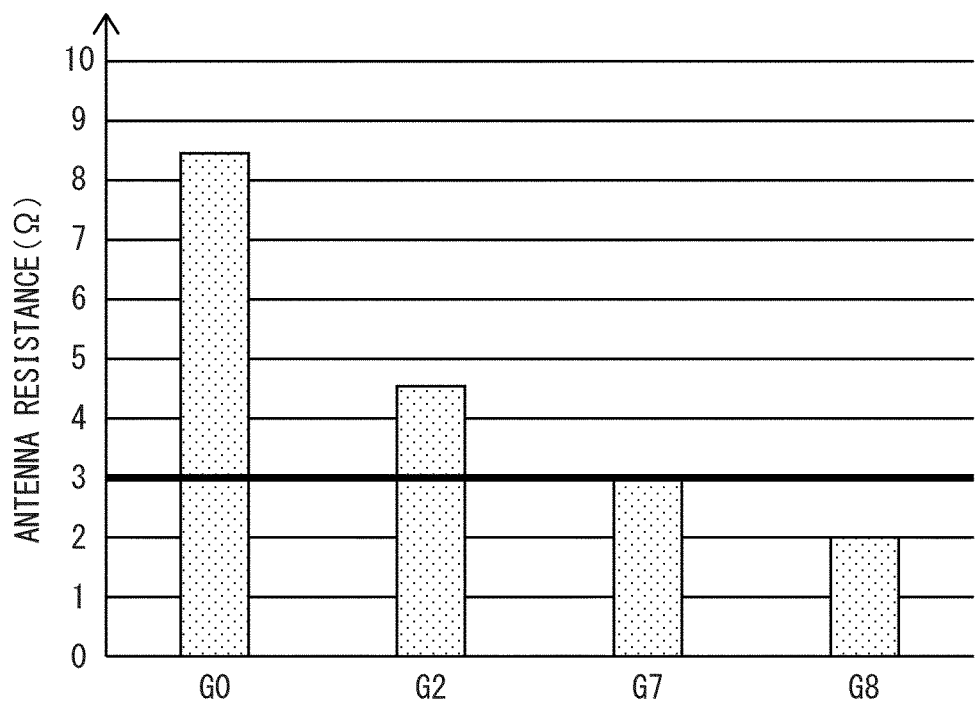

FIG. 11 is a graph showing antenna resistances of NFC antennas in accordance with Embodiment 3.

Figure 12:
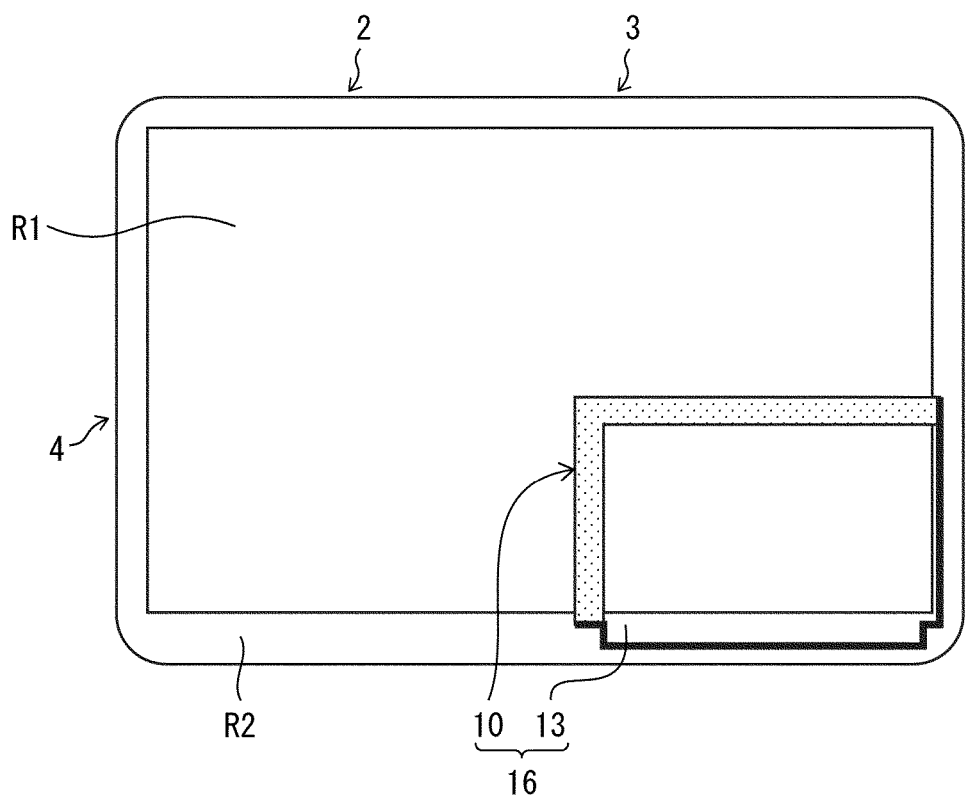

FIG. 12 is a plan view illustrating an antenna substrate in accordance with Embodiment 4.

Figure 13:
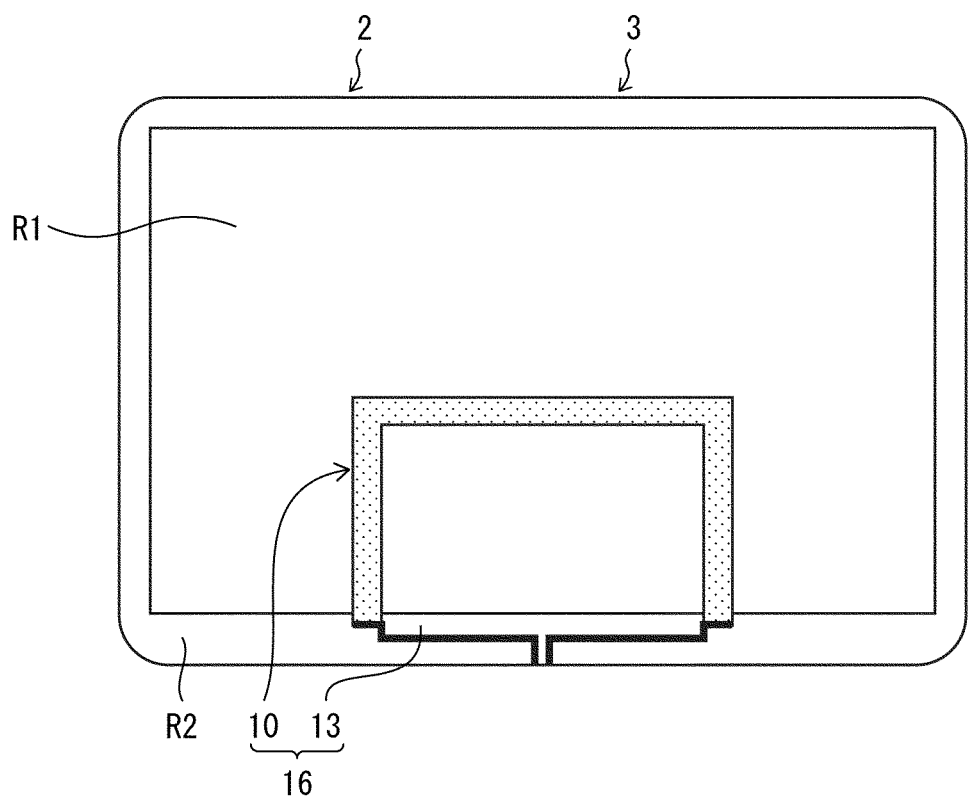

FIG. 13 is a plan view illustrating another antenna substrate in accordance with Embodiment 4.

Figure 14:
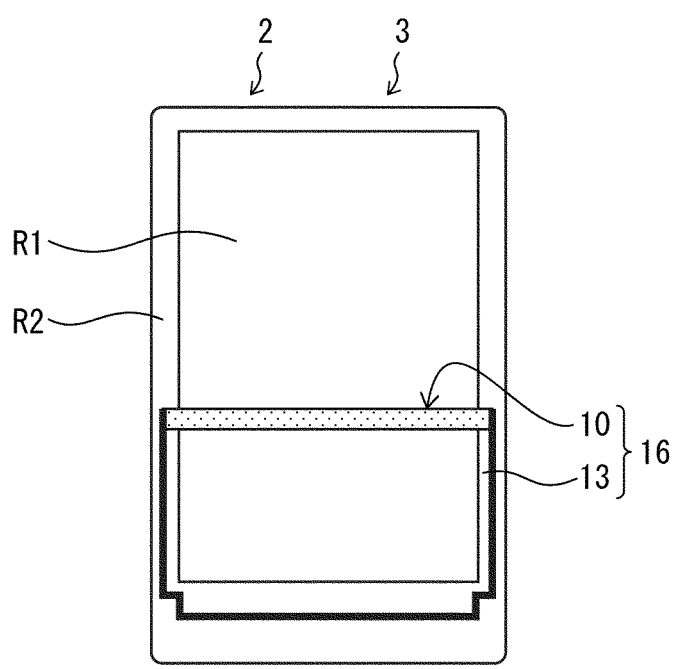

FIG. 14 is a plan view illustrating still another antenna substrate in accordance with Embodiment 4.

DESCRIPTION OF EMBODIMENTS

The following description will discuss details of Embodiments of the present invention.

Embodiment 1

(Configuration of Liquid Crystal Display Device 1)

Figure 1:
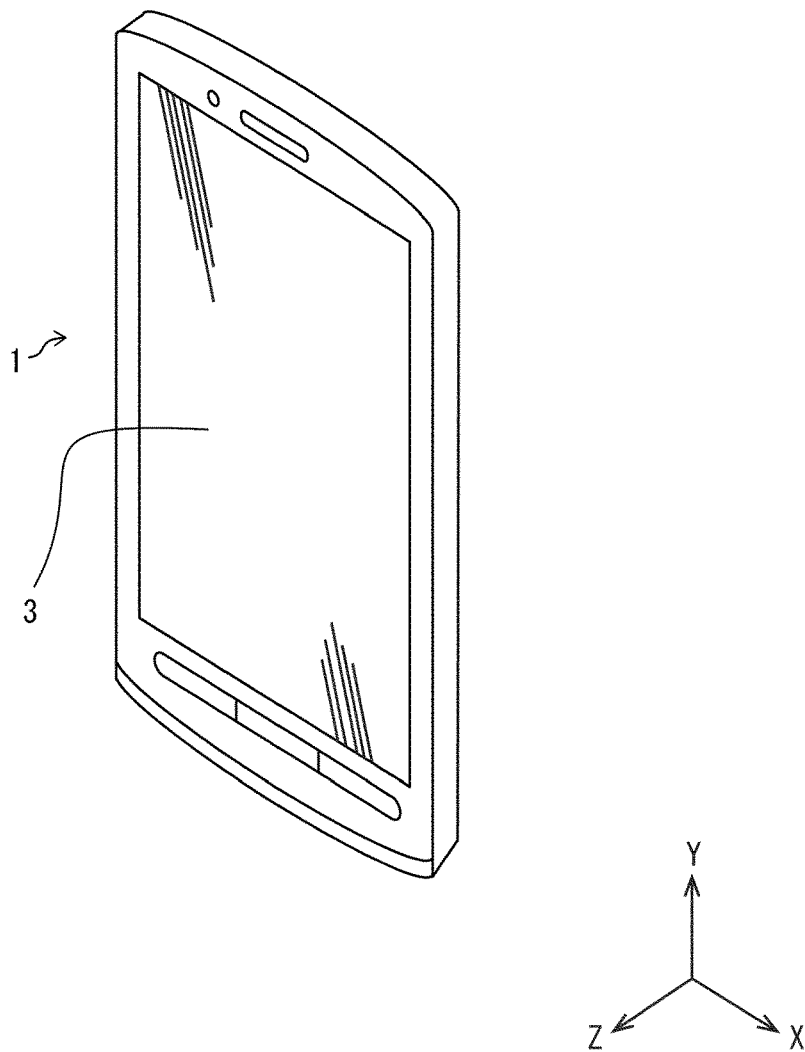
FIG. 1 is a perspective view illustrating an appearance of a liquid crystal display device in accordance with Embodiment 1.
Figure 2:
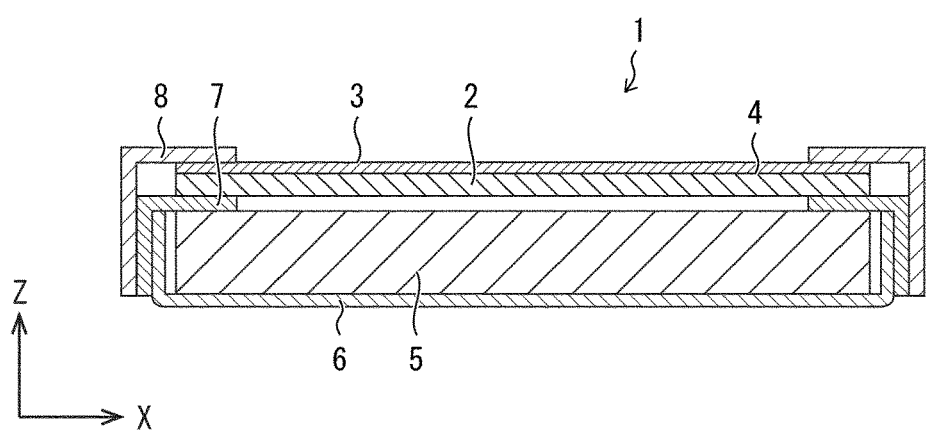
FIG. 2 is a cross sectional view of the liquid crystal display device.

FIG. 1 is a perspective view illustrating an appearance of a liquid crystal display device 1 (display device) in accordance with Embodiment 1. FIG. 2 is a cross sectional view of the liquid crystal display device 1. The liquid crystal display device 1 includes a liquid crystal panel 2 (display panel) for displaying an image, an antenna substrate 3 provided so as to face a display surface 4 of the liquid crystal panel 2, a backlight device 5 which is an external light source that emits light toward the liquid crystal panel 2. The liquid crystal panel 2 and the antenna substrate 3 are stacked on top of each other such that the liquid crystal panel 2 and the antenna substrate 3 are opposed to each other, and are bonded to each other by a substantially transparent bonding layer (not illustrated) which is provided between the liquid crystal panel 2 and the antenna substrate 3. The liquid crystal panel 2 and the antenna substrate 3 are thus integrated with each other. Preferably, the bonding layer is, for example, an Optical Clear Adhesive (OCA) tape Further, the liquid crystal display device 1 includes a chassis 6 in which the backlight device 5 is provided, a frame 7 for holding the backlight device 5 between the frame 7 and the chassis 6, and a bezel 8 for holding the liquid crystal panel 2 and the antenna substrate 3 between the bezel 8 and the frame 7.

The liquid crystal display device 1 in accordance with Embodiment 1 is used in various electronic devices such as smartphones and tablets. Accordingly, a screen size of the liquid crystal panel 2 constituting the liquid crystal display device 1 is approximately 3 inches to ten-odd inches. The display panel 2 having such a screen size is classified as a display panel of a small size to a medium size. Further, a method of communication between the liquid crystal display device 1 and an external device is preferably a short-distance radio communication such as NFC. Specific examples of the external device for performing a short-distance radio communication with the liquid crystal display device 1 encompass an IC card and a smartphone each of which has a built-in external device-side antenna. Following display of the liquid crystal display device 1, a user brings the external device such as an IC card or a smartphone to an NFC antenna which is provided in the antenna substrate 3. Then, the short-distance radio communication can be performed between the external device-side antenna of the external device and the NFC antenna of the antenna substrate.

Further, the antenna having a size of approximately 4 inches to 5 inches, as described in the present specification, can be applied to various electronic devices such as an information display, an electronic blackboard, a television receiver, etc. each of which has a size of approximately ten-odd inches to fifty-odd inches. In this case, the antenna is provided at a plurality of positions.

Figure 3:
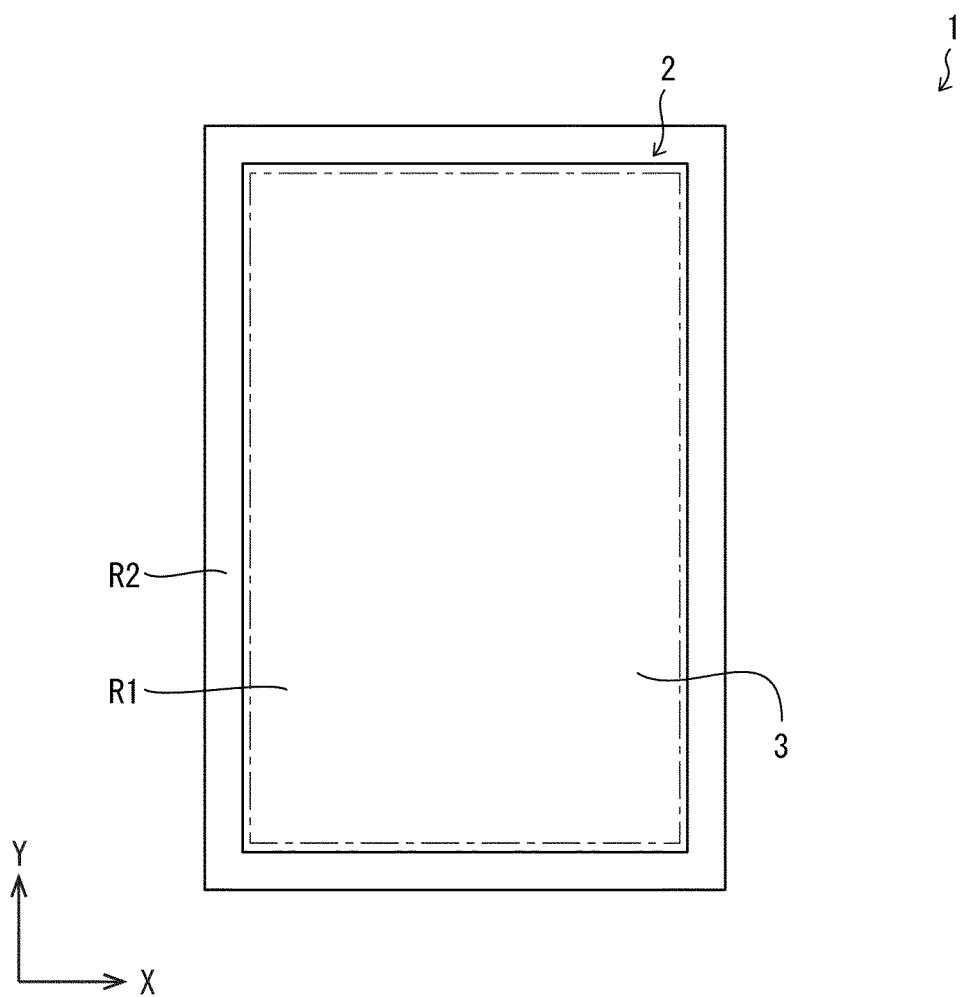
FIG. 3 is a view illustrating a display region and a non-display region of a liquid crystal panel which is provided in the liquid crystal display device.

FIG. 3 is a view illustrating a display region R1 and a non-display region R2 of the liquid crystal panel 2 which is provided in the liquid crystal display device 1.

As illustrated in FIGS. 2 and 3, the shape of the liquid crystal panel 2 is a vertically long quadrangle (rectangle) which is approximately 5 inches long when viewed along a z axis direction. The liquid crystal panel 2 is configured to include: a pair of glass substrates excellent in light-transmitting property; and liquid crystal. The glass substrates are bonded to each other in a state in which a predetermined gap is provided between the glass substrates. The liquid crystal is provided in the gap. The liquid crystal panel 2 is incorporated into the liquid crystal display device 1, in a posture in which a long-side direction of the liquid crystal panel 2 corresponds to a Y axis direction, a short-side direction of the liquid crystal panel 2 corresponds to an X axis direction, and a thickness direction of the liquid crystal panel 2 corresponds to the Z axis direction. One (array substrate) of the pair of substrates is provided with a switching element (e.g., TFT (Thin Film Transistor)) connected to a source wiring and a gate wiring that are orthogonal to each other, a pixel electrode connected to the switching element, an alignment film, etc. Meanwhile, the other one (Color Filter (CF) substrate) of the pair of substrates is provided with a color filter including colored portions of Red (R), Green (G), Blue (B), etc. which color portions are provided in a predetermined arrangement, a counter electrode, another alignment film, etc.

The display surface 4 of the liquid crystal panel 2 is divided into the display region (active area) R1 and the non-display region (non-active area) R2. The display region R1 is in a central region of a screen and capable of displaying an image. Meanwhile, the non-display region R2 is in a peripheral region of the screen and is in the form of a frame surrounding the display region R1. The shape of the display region R1 is a vertically long quadrangle, whereas the shape of the non-display region R2 is a shape of a vertically long frame. In FIG. 3, the display region R1 is an area enclosed by a dashed-dotted line and the non-display region R2 is an area outside the display region R1.

In the display region R1 of the liquid crystal panel 2, many pixels are arranged along the X axis direction and the Y axis direction in a matrix form within a plane of the display surface 4. These pixels each are made of the pixel electrode of the one of the pair of substrates and the color filter (each colored portion) of the other one of the pair of substrates.

Onto outer surfaces of the pair of substrates, a pair of polarizers is bonded such that the polarizers are provided on front and back outer surfaces of the pair of substrates, respectively. The backlight device 5 supplying light to the liquid crystal panel 2 configured as above includes at least (i) a light source (e.g., a cold cathode fluorescent tube, an light emitting diode (LED), or an Electro-Luminescence (EL)) and (ii) an optical member having an optical function such as a function of converting the form of light emitted by the light source to a planar form.

(Configurations of Antenna Substrate 3 and NFC Antenna)

Next, the following will discuss the antenna substrate 3 and the NFC antenna provided on the antenna substrate 3. The antenna substrate 3 is made of a synthetic resin material such as polyethylene terephthalate (PET) or the like. Moreover, the antenna substrate 3 has an excellent light-transmitting property and is substantially transparent. Further, the antenna substrate 3 is in a sheet form as illustrated in FIGS. 2 and 3.

(a) of FIG. 4 is a plan view of an antenna substrate 3 in accordance with a Comparative Example and (b) of FIG. 4 is a cross sectional view taken along plane AA shown in (a) of FIG. 4.

The antenna substrate 3 is provided with a metal mesh (mesh (netlike) metal film) 9, which is formed in the display region R1 on an inside surface (i.e., a surface on a liquid crystal panel 2 side) of the antenna substrate 3. Part of this metal mesh 9 constitutes the NFC antenna. The metal mesh 9 is formed by (i) forming a solid metal film having a light-blocking property on the antenna substrate 3, and then (ii) forming many fine mesh lines ME in a grid-like form by patterning by, for example, etching the solid metal film. It is possible to reliably have a certain level of optical transmittance of the antenna substrate 3 by allowing light to pass through the openings surrounded by the mesh lines ME. The mesh lines ME patterned in the metal mesh 9 form the openings which are regularly arranged in a matrix form in a plane of the antenna substrate 3. The openings each have a square shape and diagonal pitches of the openings are approximately 0.1 mm to 0.3 mm.

The mesh lines ME of the metal mesh 9 are formed substantially all over the display region R1 on the antenna substrate 3, as illustrated in FIG. 4. This makes it difficult to produce a difference in light transmittance (transparency) of the antenna substrate 3 between an antenna formation region in which the NFC antenna is formed and a non-antenna formation region in which the NFC antenna is not formed.

In the metal mesh 9, two or more cutout portions 11 each having a substantially hexagonal shape are formed in parallel to each other. This allows a plurality of mesh antenna pattern lines 10 arranged in a substantially hexagonal shape to be formed in parallel to each other. The mesh antenna pattern lines 10 are each formed in a loop form and each have both ends connected to a terminal section 12 provided in the non-display region R2.

In the non-display region R2, a light shielding film (not illustrated) is formed substantially all over the inside surface of the antenna substrate 3, and further, a non-mesh metal film (solid metal film) constituting the terminal section 12 is formed on the inside substrate of the antenna substrate 3. The mesh metal film and the non-mesh metal film are each made of a metal material, such as copper or aluminum, which is excellent in electrical conductivity.

(a) of FIG. 5 is a plan view of the antenna substrate 3 of the liquid crystal panel 2 which antenna substrate 3 is provided so as to be opposed to the display surface 4 of the liquid crystal panel 2, and (b) of FIG. 5 is a cross sectional view taken along plane BB in (a) of FIG. 5.

The configuration of the Comparative Example illustrated in FIG. 4 has a problem that since a resistance of the mesh antenna pattern lines 10 is high, the configuration cannot conform to the EMV specification. In a case where as an attempt to solve the problem, such a high resistance is to be decreased for making the configuration conform to the EMV specification, it is necessary to reduce a mesh pitch or to increase the width of an antenna pattern line (mesh line ME). Then, this decreases an aperture ratio of the NFC antenna on the display panel, and consequently leads to problems of a deteriorated transparency of the NFC antenna and of a lower display quality of the display panel.

In view of the above problem, in Embodiment 1, part of the mesh antenna pattern lines 10 is put in the non-display region R2 outside the display region R1 and further, this part of the mesh antenna pattern lines 10 in the non-display region R2 is replaced by metal lines (non-mesh antenna pattern lines 13) formed in a form having no mesh.

An NFC antenna 16 illustrated in FIG. 5 is in the form of a frame whose contour is a substantially hexagonal shape. The NFC antenna 16 has two portions provided with the non-mesh antenna pattern lines 13 formed in a form having no mesh. These two portions correspond to two sides of the substantially hexagonal shape in the non-display region R2.

Meanwhile, the NFC antenna 16 has the other portions corresponding to remaining four sides of the substantially hexagonal shape in the display region R1, which portions are provided with the mesh antenna pattern lines 10 that are transparent and formed in a netlike form. The width of the non-mesh antenna pattern lines 13 is larger than the width of the mesh antenna pattern lines 10.

As described above, since the part of the mesh antenna pattern lines 10 is replaced by the non-mesh antenna pattern lines 13 in the non-display region R2, the NFC antenna can have a decreased antenna resistance and at the same time an aperture ratio that is not decreased. This makes it possible to improve antenna performance, so that the NFC antenna 16 can conform to the EMV specification.

(a) of FIG. 6 is a plan view of an antenna substrate 3 in accordance with another Comparative Example. (b) of FIG. 6 is a plan view of another antenna substrate in accordance with Embodiment 1. (c) of FIG. 6 is a plan view of still another antenna substrate 3 in accordance with Embodiment 1.

Mesh antenna pattern lines 10 of the antenna substrate 3 illustrated in (a) of FIG. 6 includes a substantially rectangular portion and a line stretching portion which is provided in a line stretching region R3 so as to connect the mesh antenna pattern lines 10 to the terminal section 12. Meanwhile, an antenna size is arranged to be approximately 5 inches. Antenna resistance values described hereinafter are each a loop resistance value of a three-winding configuration antenna whose size is approximately 5 inches.

In a case where part of the mesh antenna pattern lines 10 provided in the line stretching region R3 is removed and the mesh antenna pattern lines 10 are configured as illustrated in (b) of FIG. 6, the antenna resistance is decreased from 8.2Ω to 7.2Ω.

Further, in a case where (i) part of the mesh antenna pattern lines 10 provided in a region R4 illustrated in (b) of FIG. 6 is removed, (ii) the non-mesh antenna pattern lines 13 are provided in the non-display region R2 as illustrated in (c) of FIG. 6, and (iii) the mesh antenna pattern lines 10 are connected with the non-mesh antenna pattern lines 13, the antenna resistance is further decreased to 4.5Ω.

Embodiment 2

Next, the following will discuss Embodiment 2 of the present invention, with reference to FIGS. 7 and 8. Note that, for convenience of explanation, identical reference numerals are given to members which have respective functions identical with those described in Embodiment 1, and descriptions of the respective members are omitted.

(a) of FIG. 7 is a plan view of an antenna substrate 3 in accordance with Embodiment 2, and (b) of FIG. 7 is a plan view of another antenna substrate 3 in accordance with Embodiment 2.

An NFC antenna 16 illustrated in (a) of FIG. 7 is configured such that in an NFC antenna 16 described above with reference to (a) of FIG. 5, (i) a line stretching portion provided in a line stretching region R3 including mesh antenna pattern lines 10 is removed and (ii) non-mesh antenna pattern lines 13 are formed also in a non-display region R2 in which a terminal section 12 is provided. Note that left and right metal mesh portions, which are shown by broken lines for easy understanding, are cut off and removed in a production process.

Whereas the NFC antenna 16 illustrated in (a) of FIG. 5 has a decreased antenna resistance of 3.9Ω, the NFC antenna 16 configured as illustrated in (a) of FIG. 7 has a further decreased antenna resistance of 3Ω.

The NFC antenna 16 illustrated in (b) of FIG. 7 is configured by turning, by 60 degrees, the mesh antenna pattern lines 10 illustrated in (a) of FIG. 7. The NFC antenna 16 is in the form of a frame whose contour is an octagonal shape. The non-mesh antenna pattern lines 13 are formed in portions which are in the non-display region R2 and which correspond to two sides of the octagonal shape. The non-mesh antenna pattern lines 13 are formed in another portion which is in the non-display region R2 where the terminal section 12 is provided. That another portion corresponds to a side of the octagonal shape which side is not adjacent to but apart from the above two sides of the octagonal shape. In the other portions corresponding to remaining five sides of the octagonal shape, the mesh antenna pattern lines 10 are formed. Note that left and right metal mesh portions, which are shown by broken lines for easy understanding, are cut off and removed in a production process.

The NFC antenna 16 configured as illustrated in (b) of FIG. 7 has an antenna resistance that is further decreased to 2.7Ω.

FIG. 8 is a graph showing antenna resistances of NFC antennas in accordance with Embodiments 1 and 2. An antenna resistance in a Comparative Example illustrated in (a) of FIG. 6 is 8.2Ω as shown by the bar graph G0. On the other hand, in a case where mesh antenna pattern lines 10 formed in a line stretching region R3 illustrated in (a) of FIG. 6 are removed as illustrated in (b) of FIG. 6, the antenna resistance is decreased to 7.2Ω as shown by the bar graph G1.

Further, in a case where the mesh antenna pattern lines 10 formed in a region R4 illustrated in (b) of FIG. 6 are removed and as illustrated in (c) of FIG. 6, non-mesh antenna pattern lines 13 are formed in a non-display region R2 where a terminal section 12 is provided, the antenna resistance is further decreased to 4.5Ω as shown by the bar graph G2.

Meanwhile, the antenna resistance is decreased to 3.9Ω as shown by the bar graph G3 in a case where as illustrated in FIG. 5, (i) the NFC antenna 16 is formed in the form of a frame whose contour is a hexagonal shape, (ii) non-mesh antenna pattern lines 13 are provided in two portions of the NFC antenna 16 which two portions are in the non-display region R2 and which two portions correspond to two sides of the hexagonal shape, and (iii) mesh antenna pattern lines 10 are provided in the other portions of the NFC antenna 16 in a remaining display region R1.

Further, the antenna resistance is decreased to 3Ω as shown by the bar graph G4, in a case where the NFC antenna 16 is configured as illustrated (a) of FIG. 7 such that (i) the line stretching portion provided in the line stretching region R3 in (a) of FIG. 5 is removed and (ii) the non-mesh antenna pattern lines 13 are formed also in the non-display region R2 where the terminal section 12 is provided.

Furthermore, in a case where the NFC antenna is configured as illustrated in (b) of FIG. 7 so as to be in the form of a frame whose contour is an octagonal shape, the antenna resistance is decreased to 2.7 Ω as shown by the bar graph G5.

When the antenna resistance becomes less than approximately 4Ω, the NFC antenna 16 conforms to the EMV specification. In particular, the NFC antenna 16 illustrated in (b) of FIG. 7 corresponding to the bar graph G5 has a favorable antenna performance and conforms to the EMV specification, since that NFC antenna 16 has an antenna resistance of less than 3Ω.

Embodiment 31

(a) of FIG. 9 is a plan view for explaining an increased width of an antenna substrate 3 in accordance with Embodiment 3. (b) of FIG. 9 is a view illustrating a configuration of mesh antenna pattern lines 10 in a transverse region R5 of the antenna substrate 3. (c) of FIG. 9 is a view illustrating a configuration of the mesh antenna pattern lines 10 in a corner region R7 of the antenna substrate 3. (d) of FIG. 9 is a view illustrating a configuration of the mesh antenna pattern lines 10 in a longitudinal region R6 of the antenna substrate 3. Note that, for convenience of explanation, identical reference numerals are given to members which have respective functions identical with those described in the above Embodiment 1 or 2, and descriptions of the respective members are omitted.

In Embodiment 3 illustrated in FIG. 9, the width of the mesh antenna pattern lines 10 of an NFC antenna 16 are increased so that an antenna resistance will be further decreased. The other configurations of Embodiment 3 illustrated in FIG. 9 are identical with those of Embodiment 1 or 2, and detailed descriptions thereof will not be repeated.

The NFC antenna 16 is in the form of a frame whose contour is a substantially quadrangular shape. In the corner region R7 of the quadrangular shape, the mesh antenna pattern lines 10 of the NFC antenna 16 have extending portions 14c which extend along an X axis direction and extending portions 15c which extend along an Y axis direction, as illustrated in (c) of FIG. 9. The width $W_{ref}$ of the extending portions 14c is equal to the width $W_{ref}$ of the extending portions 15c. In the transverse region R5 of the quadrangular shape which transverse region R5 stretches in the X direction, the mesh antenna pattern lines 10 have extending portions 14b (first extending portions) which extend along the X axis direction and extending portions 15b (second extending portions) which extend along the Y axis direction, as illustrated in (b) of FIG. 9. The width $W_Y$ of the extending portions 14b is larger than the width $W_{ref}$ of the extending portions 15b. In the longitudinal region R6 of the quadrangular shape which longitudinal region R6 stretches in the Y direction, the mesh antenna pattern lines 10 have extending portions 14d (second extending portions) which extend along the X axis direction and extending portions 15d (first extending portions) which extend along the Y axis direction, as illustrated in (d) of FIG. 9. The width $W_X$ of the extending portions 15d is larger than the width $W_{ref}$ of the extending portions 14d.

As described above, the mesh antenna pattern lines 10 include the extending portions 14b which extend along a direction in which the mesh antenna pattern lines 10 run and the extending portions 15b which extend along a direction crossing the direction in which the mesh antenna pattern lines 10 run. The width $W_Y$ of the extending portions 14b is larger than the width $W_{ref}$ of the extending portions 15b. Further, the mesh antenna pattern lines 10 include the extending portions 15d which extend along the direction in which the mesh antenna pattern lines 10 run and the extending portions 14d which extend along the direction crossing the direction in which the mesh antenna pattern lines 10 run. The width $W_X$ of the extending portions 15d is larger than the width $W_{ref}$ of the extending portions 14d.

As described above, the mesh antenna pattern lines 10 are configured such that the extending portions extending along the direction in which the mesh antenna pattern lines 10 run are wider. This makes it possible to further decrease the antenna resistance of the NFC antenna 16.

(a) of FIG. 10 is a plan view for explaining anisotropy of the antenna substrate 3 in accordance with Embodiment 3. (b) of FIG. 10 is a view illustrating a configuration of mesh antenna pattern lines 10 in a transverse region R8 of the antenna substrate 3. (c) of FIG. 10 is a view illustrating a configuration of the mesh antenna pattern lines 10 in longitudinal regions R9 and R10 of the antenna substrate 3.

In Embodiment 3 illustrated in FIG. 10, anisotropy is imparted to the mesh antenna pattern lines 10 of an NFC antenna 16 so that the antenna resistance will be decreased. The other configurations of Embodiment 3 illustrated in FIG. 10 are identical with those of Embodiment 1 or 2, and detailed descriptions thereof will not be repeated.

The NFC antenna 16 is in the form of a frame whose contour is a substantially quadrangular shape. In the transverse region R8 of the quadrangular shape which transverse region R8 stretches in an X axis direction, the mesh antenna pattern lines 10 have a plurality of extending portions 14e (first extending portions) which extend along the X axis direction and a plurality of extending portions 15e (second extending portions) which extend along a Y axis direction, as illustrated in (b) of FIG. 10. A pitch between adjacent extending portions 14e is half the standard pitch L, while a pitch between adjacent extending portions 15e is twice the standard pitch L. This makes it possible to have a reduced resistance in the X direction in the transverse region R8 and at the same time an unchanged aperture ratio.

In the longitudinal regions R9 and R10 stretching in the Y axis direction, the mesh antenna pattern lines 10 have a plurality of extending portions 14f (second extending portions) which extend along the X axis direction and a plurality of extending portions 15f (first extending portions) which extend along the Y axis direction, as illustrated in (c) of FIG. 10. A pitch between adjacent extending portions 15f is half the standard pitch L, while a pitch between adjacent extending portions 14f is twice the standard pitch L. This makes it possible to have a reduced resistance in the Y direction in the longitudinal regions R9 and R10 and at the same time an unchanged aperture ratio.

As described above, the mesh antenna pattern lines 10 are configured such that the extending portions extending in the direction in which the mesh antenna pattern lines 10 run are provided at smaller pitches. This makes it possible to impart anisotropy to the antenna pattern and thereby further decrease the antenna resistance of the NFC antenna 16, while an aperture ratio of the NFC antenna 16 is kept the same.

FIG. 11 is a graph showing the antenna resistances of the NFC antennas 16 in accordance with Embodiment 3. In a case where as illustrated in (c) of FIG. 6, non-mesh antenna pattern lines 13 are formed in a non-display region R2 where a terminal section 12 is provided, the NFC antenna 16 has a further decreased antenna resistance of 4.5Ω as shown by the bar graph G2. Further, in a case where anisotropy is imparted to the mesh antenna pattern lines 10 as illustrated in FIG. 10, the antenna resistance is decreased to 3Ω as shown by the bar graph G7.

In a case where the width of the mesh antenna pattern lines 10 is increased as illustrated in FIG. 9 in addition to imparting the anisotropy to the antenna pattern lines 10, the antenna resistance is decreased to 2Ω as shown by the bar graph G8.

Embodiment 41

FIG. 12 is a plan view illustrating an antenna substrate 3 in accordance with Embodiment 4. Note that, for convenience of explanation, identical reference numerals are given to members which have respective functions identical with those described in any of the above Embodiments 1 to 3, and descriptions of the respective members are omitted.

An NFC antenna 16 is in the form of a frame whose contour is a quadrangular shape. Transparent mesh antenna pattern lines 10 are formed in portions corresponding to an upper side and a left side of the quadrangular shape, which upper side and left side are adjacent to each other. Further, non-mesh antenna pattern lines 13 are formed in portions corresponding to a lower side and a right side of the quadrangular shape. The non-mesh antenna pattern lines 13 are made of non-transparent metal lines.

In a case where, for example, (i) the NFC antenna 16 is provided in a lower-right corner of a display region R1 in a display surface 4 of a liquid crystal panel 2 and (ii) the NFC antenna 16 is configured as described above such that the lower side and the right side of the NFC antenna 16 are made of the non-transparent metal lines and the upper side and the left side of the NFC antenna 16 are made of the transparent mesh antenna pattern lines 10, the NFC antenna 16 in a loop form has an antenna resistance that is decreased to half. This makes it possible to realize a higher performance of the NFC antenna 16.

FIG. 13 is a plan view illustrating another antenna substrate 3 in accordance with Embodiment 4. An NFC antenna 16 is in the form of a frame whose contour is a quadrangular shape. The NFC antenna 16 has portions which correspond to an upper side, a left side, and a right side of the quadrangular shape in a display region R1. In these portions, transparent mesh antenna pattern lines 10 are formed. Further, the NFC antenna 16 has a portion corresponding to a lower side of the quadrangular shape in a non-display region R2. In that portion, non-mesh antenna pattern lines 13 made of non-transparent metal lines are formed. This leads to a decreased antenna resistance.

In a case where, as described above, (i) the NFC antenna 16 having a quadrangular shape is provided in a lower end area of the display region R1, (ii) the lower side of the NFC antenna 16 is made of the non-transparent metal lines, and (iii) the upper side, the left side, and the right side of the NFC antenna 16 are made of the transparent mesh antenna pattern lines 10, the NFC antenna 16 in a loop form has an antenna resistance that is decreased to approximately 0.7 to 0.8 times. This makes it possible to realize a higher performance of the NFC antenna 16.

FIG. 14 is a plan view illustrating still another antenna substrate 3 in accordance with Embodiment 4. An NFC antenna 16 is in the form of a frame whose contour is a quadrangular shape. The NFC antenna 16 has portions corresponding to a left side, a right side and a lower side of the quadrangular shape in a non-display region R2, and in these portions, non-mesh antenna pattern lines 13 made of non-transparent metal lines are formed. Further, the NFC antenna 16 has a portion corresponding to an upper side of the quadrangular shape in a display region R1 and in that portion, transparent mesh antenna pattern lines 10 are formed.

In a case where, as described above, (i) the NFC antenna 16 having a quadrangular shape is provided in an end area of the display region R1, and (ii) the left side, the right side, and the lower side of the NFC antenna 16 are made of the non-mesh antenna pattern lines 13 which are non-transparent metal lines, and (iii) the upper side of the NFC antenna 16 is made of the transparent mesh antenna pattern lines 10, the NFC antenna 16 in a loop form has an antenna resistance that is decreased to approximately 0.3 times. This makes it possible to realize a higher performance of the NFC antenna 16. Note that though Embodiments 1 to 4 discussed examples in each of which only one antenna is provided on a display, an embodiment of the present invention is not limited to such a configuration. For example, it is possible to provide an antenna function in a plurality of areas on a large-screen display, for example, by (i) providing, on that large display, a plurality of NFC antennas each configured as disclosed in any of the above Embodiments 1 to 4 and (ii) driving the NFC antennas in those areas, respectively. Meanwhile, in order to drive, on a display, an NFC antenna(s) disclosed in any of Embodiments 1 to 4 of the present application, a matching circuit, a driver substrate, etc. are required. However, illustrations and descriptions of such a matching circuit, a driver substrate, etc. are omitted in the present specification. Note that it is needless to say that the matching circuit, the driver substrate, etc. are necessary when the NFC antenna(s) is/are actually used.

[Recap]

An NFC antenna 16 in accordance with Aspect 1 of the present invention is an NFC antenna 16 being a loop antenna and provided so as to face a display surface 4 of a display panel (liquid crystal panel 2), the display surface 4 including a display region R1 capable of displaying an image and a non-display region R2 surrounding, in a frame-like manner, the display region R1, the NFC antenna 16 including: a mesh antenna pattern line 10 being transparent and formed in a netlike form in the display region R1; and a non-mesh antenna pattern line 13 being formed in a form having no mesh in the non-display region R2.

In the above configuration, the NFC antenna includes the non-mesh antenna pattern line which is formed in a form having no mesh in the non-display region. This makes it possible to decrease the antenna resistance of the NFC antenna, so that the NFC antenna can conform to the EMV specification.

An NFC antenna 16 in accordance with Aspect 2 of the present invention may be configured such that: in the above Aspect 1, the non-mesh antenna pattern line is larger in width than the mesh antenna pattern line.

In the above configuration, the non-mesh antenna pattern line, which is larger in width, can further decrease the antenna resistance.

An NFC antenna 16 in accordance with Aspect 3 of the present invention may be configured such that: in the above Aspect 1 or 2, at least either one of the mesh antenna pattern line 10 and the non-mesh antenna pattern line 13 is made of copper or aluminum.

In the above configuration, a material having a lower resistance can further decrease the antenna resistance.

An NFC antenna 16 in accordance with Aspect 4 of the present invention may be configured such that: in any one of the above Aspects 1 to 3, the NFC antenna 16 is in a form of a frame whose contour has a quadrangular shape; the mesh antenna pattern line 10 is formed in portions corresponding to three sides of the quadrangular shape; and the non-mesh antenna pattern line 13 is formed in a portion corresponding to remaining one side of the quadrangular shape.

In the above configuration, one side of the NFC antenna 16 is made of the non-mesh antenna pattern line and the other three sides of the NFC antenna 16 are each made of the mesh antenna pattern line. This makes it possible to decrease the antenna resistance to approximately 0.7 to 0.8 times.

An NFC antenna 16 in accordance with Aspect 5 of the present invention may be configured such that: in any one of the above Aspects 1 to 3, the NFC antenna 16 is in a form of a frame whose contour has a hexagonal shape; the non-mesh antenna pattern line 13 is formed in portions corresponding to two sides of the hexagonal shape, the two sides being opposed to each other; and the mesh antenna pattern line 10 is formed in portions corresponding to remaining four sides of the hexagonal shape.

The above configuration is obtained, from a conventional hexagonal antenna pattern, by removing left and right antenna patterns outside a display region which is capable of displaying an image in the conventional hexagonal antenna pattern, and providing the non-mesh antenna pattern line in the non-display region. The configuration makes it possible to decrease the antenna resistance of the NFC antenna as a whole.

An NFC antenna 16 in accordance with Aspect 6 of the present invention may be configured such that: in any one of the above Aspects 1 to 3, the NFC antenna 16 is in a form of a frame whose contour has an octagonal shape; the non-mesh antenna pattern line 13 is formed in (i) portions corresponding to two sides of the octagonal shape which two sides are opposed to each other and (ii) a portion corresponding to another side of the octagonal shape which another side is not adjacent to each of the two sides but apart from each of the two sides; and the mesh antenna pattern line 10 is formed in portions corresponding to remaining five sides of the octagonal shape.

The above configuration increases portions in which the non-mesh antenna pattern line is provided, so that the antenna resistance can be further decreased.

An NFC antenna 16 in accordance with Aspect 7 of the present invention may be configured such that: in any one of the above Aspects 1 to 6, the mesh antenna pattern line 10 includes (a) a first extending portion (extending portion 14b, 15d) which extends along a direction in which the mesh antenna pattern line 10 runs and (b) a second extending portion (extending portion 15b, 14d) which extends along a direction crossing the direction in which the mesh antenna pattern line 10 runs; and the first extending portion (extending portion 14b, 15d) is larger in width than the second extending portion (extending portion 15b, 14d).

In the above configuration, an increased width of the mesh antenna pattern line can further decrease the antenna resistance.

An NFC antenna 16 in accordance with Aspect 8 of the present invention may be configured such that: in any one of the above Aspects 1 to 7, the mesh antenna pattern line 10 includes (a) a plurality of first extending portions (extending portions 14e, 15f) which extend along a direction in which the mesh antenna pattern line 10 runs and (b) a plurality of second extending portions (extending portions 15e, 14f) which extend along a direction crossing the direction in which the mesh antenna pattern line 10 runs; and the first extending portions (extending portions 14e, 15f) are provided at smaller pitches than the second extending portions (extending portions 15e, 14f).

In the above configuration, anisotropy is imparted to the mesh antenna pattern line, so that the antenna resistance can be further decreased.

An NFC antenna 16 in accordance with Aspect 9 of the present invention may be configured such that: in any one of the above Aspects 1 to 3, the NFC antenna 16 is in a form of a frame whose contour has a quadrangular shape; the mesh antenna pattern line 10 is formed in portions corresponding to two sides of the quadrangular shape, the two sides being adjacent to each other; and the non-mesh antenna pattern line 13 is formed in portions corresponding to remaining two sides of the quadrangular shape.

In the above configuration, two adjacent sides of the NFC antenna 16 are made of the mesh antenna pattern line and the other two sides of the NFC antenna 16 are made of the non-mesh antenna pattern line. This makes it possible to decrease the antenna resistance to approximately one-half.

An NFC antenna 16 in accordance with Aspect 10 of the present invention may be configured such that: in any one of the above Aspects 1 to 3, the NFC antenna 16 is in a form of a frame whose contour has a quadrangular shape; and the non-mesh antenna pattern line 13 is formed in portions corresponding to three sides of the quadrangular shape; and the mesh antenna pattern line 10 is formed in a portion corresponding to remaining one side of the quadrangular shape.

In the above configuration, three sides of the NFC antenna 16 are made of the non-mesh antenna pattern line and the other one side of the NFC antenna 16 is made of the mesh antenna pattern line. This makes it possible to decrease the antenna resistance to approximately 0.3 times.

A display device (liquid crystal display device 1) in accordance with Aspect 11 of the present invention includes: a display panel (liquid crystal panel 2); an NFC antenna 16 as recited in any one of Aspects 1 to 10; and an antenna substrate 3 on which the NFC antenna 16 is provided.

The present invention is not limited to the above-described Embodiments. For example, it is possible to provide an NFC antenna described in the present specification on a display which includes a touch panel. Further, the present invention can be altered within the scope of claims by a skilled person in the art. The present invention also encompasses, in its technical scope, any embodiment derived by combining technical means disclosed in differing embodiments. Further, a new technical feature can be formed by combining technical means disclosed in the embodiments.

REFERENCE SIGNS LIST

1 liquid crystal display device (display device)
2 liquid crystal panel (display panel)
3 antenna substrate
4 display surface
10 mesh antenna pattern line
11 cutout portion
13 non-mesh antenna pattern line
14 extending portion (first extending portion)
15 extending portion (second extending portion)
16 NFC antenna
R1 display region
R2 non-display region

The invention claimed is:

1. An NFC antenna being a loop antenna and provided so as to face a display surface of a display panel, the display surface including a display region capable of displaying an image and a non-display region surrounding, in a frame-like manner, the display region, the NFC antenna comprising:
   a mesh antenna pattern line being transparent and formed in a netlike form in the display region; and
   a non-mesh antenna pattern line being formed in a form having no mesh in the non-display region.

2. The NFC antenna as set forth in claim 1, wherein:
   the non-mesh antenna pattern line is larger in width than the mesh antenna pattern line.

3. The NFC antenna as set forth in claim 1, wherein:
   at least either one of the mesh antenna pattern line and the non-mesh antenna pattern line is made of copper or aluminum.

4. The NFC antenna as set forth in claim 1, wherein:
   the NFC antenna is in a form of a frame whose contour has a quadrangular shape;
   the mesh antenna pattern line is formed in portions corresponding to three sides of the quadrangular shape; and
   the non-mesh antenna pattern line is formed in a portion corresponding to remaining one side of the quadrangular shape.

5. The NFC antenna as set forth in claim 1, wherein:
   the NFC antenna is in a form of a frame whose contour has a hexagonal shape;
   the non-mesh antenna pattern line is formed in portions corresponding to two sides of the hexagonal shape, the two sides being opposed to each other; and
   the mesh antenna pattern line is formed in portions corresponding to remaining four sides of the hexagonal shape.

6. The NFC antenna as set forth in claim 1, wherein:
   the NFC antenna is in a form of a frame whose contour has an octagonal shape;
   the non-mesh antenna pattern line is formed in (i) portions corresponding to two sides of the octagonal shape which two sides are opposed to each other and (ii) a portion corresponding to another side of the octagonal shape which another side is not adjacent to each of the two sides but apart from each of the two sides; and the mesh antenna pattern line is formed in portions corresponding to remaining five sides of the octagonal shape.

7. The NFC antenna as set forth in claim 1, wherein:

the mesh antenna pattern line includes (a) a first extending portion which extends along a direction in which the mesh antenna pattern line runs and (b) a second extending portion which extends along a direction crossing the direction in which the mesh antenna pattern line runs; and the first extending portion is larger in width than the second extending portion.

8. The NFC antenna as set forth in claim 1, wherein:

the mesh antenna pattern line includes (a) a plurality of first extending portions which extend along a direction in which the mesh antenna pattern line runs and (b) a plurality of second extending portions which extend along a direction crossing the direction in which the mesh antenna pattern line runs; and the first extending portions are provided at smaller pitches than the second extending portions.

9. The NFC antenna as set forth in claim 1, wherein:

the NFC antenna is in a form of a frame whose contour has a quadrangular shape;

the mesh antenna pattern line is formed in portions corresponding to two sides of the quadrangular shape, the two sides being adjacent to each other; and the non-mesh antenna pattern line is formed in portions corresponding to remaining two sides of the quadrangular shape.

10. The NFC antenna as set forth in claim 1, wherein:

the NFC antenna is in a form of a frame whose contour has a quadrangular shape;

the non-mesh antenna pattern line is formed in portions corresponding to three sides of the quadrangular shape; and the mesh antenna pattern line is formed in a portion corresponding to remaining one side of the quadrangular shape.

11. A display device comprising:

a display panel;

an NFC antenna as recited in claim 1; and an antenna substrate on which the NFC antenna is provided.

* * * * *